(12) United States Patent
Gross et al.

(10) Patent No.: US 7,519,855 B2
(45) Date of Patent: Apr. 14, 2009

(54) METHOD AND SYSTEM FOR DISTRIBUTING DATA PROCESSING UNITS IN A COMMUNICATION NETWORK

(75) Inventors: Joel L. Gross, Gilbert, AZ (US); Vasanthi Raghuram, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 244 days.

(21) Appl. No.: 11/424,392

(22) Filed: Jun. 15, 2006

(65) Prior Publication Data

US 2007/0294255 A1 Dec. 20, 2007

(51) Int. Cl.
*G06F 11/00* (2006.01)
(52) U.S. Cl. ............................................. 714/10; 714/4
(58) Field of Classification Search ........................ None
See application file for complete search history.

(56) References Cited

U.S. PATENT DOCUMENTS 6,944,785 B2* 9/2005 Gadir et al. .................... 714/4
2002/0133727 A1* 9/2002 Dervin et al. ................ 713/310
2005/0081110 A1* 4/2005 Rostron ........................ 714/38
2006/0080569 A1* 4/2006 Sciacca ........................... 714/4
2006/0142495 A1* 6/2006 Lalho et al. ................. 525/240

* cited by examiner

*Primary Examiner*—Michael C Maskulinski (57) ABSTRACT

A method and system for distributing a plurality of data processing units (116, 118, 120, 122, 124, 126, 128, 130 and 132) in a communication network (100) is provided. The communication network comprises a plurality of manager data processing units (104, 106 and 108) for serving the plurality of data processing units. The method includes detecting (304) a failure at a manager data processing unit of the plurality of manager data processing units. Further, the method includes distributing (306) the plurality of data processing units to remaining manager data processing units of the plurality of manager data processing units.

22 Claims, 4 Drawing Sheets

METHOD AND SYSTEM FOR DISTRIBUTING DATA PROCESSING UNITS IN A COMMUNICATION NETWORK

FIELD OF INVENTION

The present invention generally relates to a communication network, and more specifically, to a method for managing plurality of data processing units in the communication network.

BACKGROUND

In a communication network, two or more data processing units (DPU) are interconnected to each other. This network of DPUs can be used to exchange resources among different data processing units. For example, the user of a first DPU can share an application, a database, or a peripheral device that is stored at a second DPU. Examples of communication networks that facilitate the functionalities mentioned above may include a local area network (LAN), a wide area network (WAN), a wireless local area network (WLAN), a general packet radio service (GPRS) network, and the Internet. The DPU can be a computer, a cellular phone, a walkie-talkie, a satellite phone, a personal digital assistant (PDA), a radio transmitter, a microprocessor or any other computational device that needs one or more resources to function.

In the communication network, the various DPUs can be classified broadly into three categories, based on the functionalities offered by them. These three categories include a core data processing unit, a manager data processing unit, and a data processing unit. The core data processing unit monitors the functioning of the manager data processing units. The manager data processing unit provides various network services to one or more data processing units. The network services provided by the manager data processing units may be Operations, Administration, Maintenance, and Provisioning (OAMP) services and other services that needed by the DPUs to function efficiently.

A failure at a manager data processing unit can cause disruption of OAMP services to the one or more data processing units. In order to provide uninterrupted OAMP services to the one or more data processing units, these one or more data processing units should be allocated to at least one active manager data processing unit. Various methods are known in the art for allocating the data processing units to the active manager data processing units. One such method involves the use of a redundant manager data processing unit or a redundant server. According to this method, a main manager data processing unit provides OAMP services to all data processing units. A redundant manager data processing unit is also deployed, in addition to the main manager data processing unit. The redundant manager data processing unit acts as a backup to the main manager data processing unit. In the event of a failure at the main manager data processing unit, the redundant manager data processing unit provides OAMP services to the data processing units. This method produces reasonably good results for small communication networks, but results in overloading of the main manager data processing units in the case of large communication networks. Hence, it is not feasible to deploy this method in relatively large communication networks. Further, if the redundant manager data processing unit has a breakdown while the main manager data processing unit is under maintenance, OAMP services to all the data processing units remain disrupted until the time when at least one of the main manager data processing units, or the redundant manager data processing unit, recovers. This results in a complete breakdown of the communication network.

Another method for managing the data processing units in the communication network is by the manual allocation of the data processing units in the event of a breakdown of a manager data processing unit. According to this method, in the event of the failure of the manager data processing unit, the data processing units are manually allocated by a network operator to the remaining active manager data processing units. This method involves significant manual intervention and often results in long delays in OAMP services being provided to the data processing units.

BRIEF DESCRIPTION OF FIGURES

Various embodiments of the invention will hereinafter be described in conjunction with the appended drawings, provided to illustrate and not to limit the invention, wherein like designations denote like elements, and in which.

Skilled artisans will appreciate that elements in the figures are illustrated for simplicity and clarity and have not necessarily been drawn to scale. For example, the dimensions of some of the elements in the figures may be exaggerated relative to other elements, to help to improve an understanding of embodiments of the present invention.

DESCRIPTION OF PREFERRED EMBODIMENTS

Before describing in detail the particular method and system for distributing data processing units in the communication network, in accordance with the present invention, it should be observed that the present invention resides primarily in combinations of the method and system for distributing data processing units in the communication network. Accordingly, the system components and method steps have been represented, where appropriate, by conventional symbols in the drawings, showing only those specific details that are pertinent for understanding the present invention, so as not to obscure the disclosure with details that will be readily apparent to those of ordinary skill in the art, having the benefit of the description herein.

In this document, relational terms such as first and second, and the like, may be used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such a process, method, article, or apparatus. An element preceded by "comprises . . . a" does not, without more constraints, preclude the existence of additional identical elements in the process, method, article, or apparatus that comprises the element.

A "set" as used in this document, means a non-empty set (i.e., comprising at least one member). The term "another", as used herein, is defined as at least a second or more. The term "including" as used herein, is defined as comprising.

A method for distributing a plurality of data processing units in a communication network is provided. The communication network includes a plurality of manager data processing units for serving the plurality of data processing units. The method includes detecting a failure at a manager data processing unit of the plurality of manager data processing units. The method further includes distributing the plurality of data processing units to remaining manager data processing units of the plurality of manager data processing units.

A method for distributing a plurality of data processing units in a communication network is provided. The communication network includes a plurality of manager data processing units for serving the plurality of data processing units. The method includes detecting a failure at a manager data processing unit of the plurality of manager data processing units. Further the method includes distributing the plurality of data processing units to remaining manager data processing units of the plurality of manager data processing units. Moreover, the method includes redistributing the plurality of data processing units to the plurality of manager data processing units, when a core data processing unit receives a restore heartbeat signal from the manager data processing unit.

A core data processing unit for monitoring a plurality of manager data processing units in a communication network is provided. The communication network includes a plurality of manager data processing units for serving the plurality of data processing units. The core data processing unit includes a monitoring module for detecting a heartbeat signal sent by each of the plurality of manager data processing units. Further the core data processing unit includes a distributing module for distributing the plurality of data processing units to remaining manager data processing units of the plurality of manager data processing units, when a failure of a manager data processing unit is indicated by the heartbeat signal.

Figure 1:
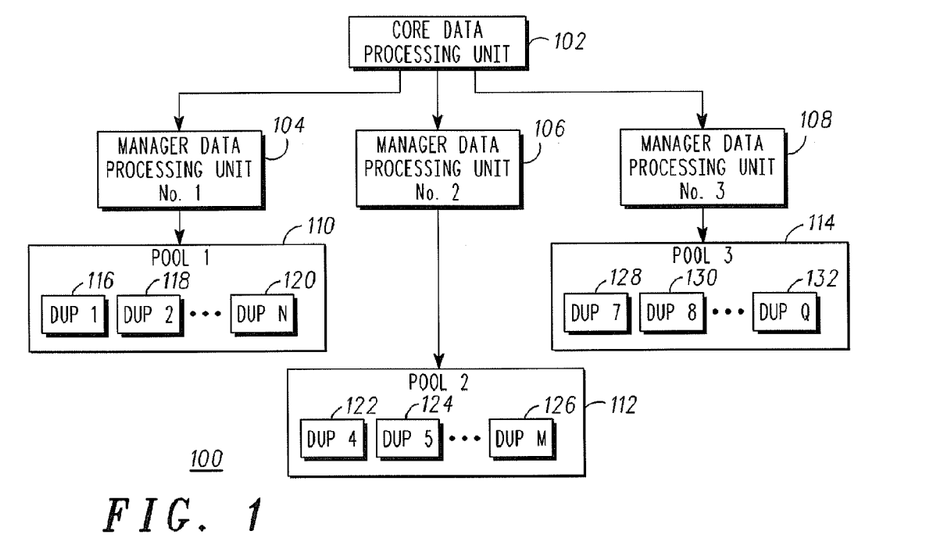
FIG. 1 is a functional diagram illustrating a communication network of data processing units, in accordance with some embodiments of the present invention.

FIG. 1 is a functional diagram illustrating a communication network 100 of data processing units, in accordance with some embodiments of the present invention. The communication network 100 can be used for exchanging resources among different data processing units. For example a user of a first data processing unit can access an application, a database or a peripheral device stored at a second data processing unit. Examples of the communication network 100 include a local area network (LAN), a wide area network (WAN), a wireless local area network (WLAN), a general packet radio service (GPRS) network, and the Internet. The communication network 100 includes a core data processing unit 102 for monitoring the functioning of a plurality of manager data processing units. Further, FIG. 1 shows manager data processing units 104, 106 and 108. The manager data processing units 104, 106, and 108 provide Operational, Administration, Maintenance and Provisioning (OAMP) services to pools of data processing units 110, 112, and 114, respectively. Examples of a data processing unit may include a cellular phone, a walkie-talkie, a satellite phone, an Internet Protocol Router, and a personal digital assistant (PDA). The manager data processing unit 104 serves the pool of data processing unit 110. The pool of data processing unit 110 contains data processing units 116, 118 and 120. Similarly, the manager data processing unit 106 serves the pool of data processing units 112, which contains data processing units 122, 124 and 126. Further, the manager data processing unit 108 serves the pool of data processing units 114, which includes data processing units 128, 130 and 132. Example of a manager data processing unit includes telecom Operations and Maintenance Centers (OMC).

For an embodiment of the present invention, the data processing units 116, 118, 120, 122, 124, 126, 128, 130, and 132 can be logically connected to the manager data processing units 104, 106 and 108, and subsequently connected to the core data processing unit 102. The logical connections can be wireless or wired. The data processing units 116, 118, 120, 122, 124, 126, 128, 130 and 132 require OAMP services to function properly. Examples of OAMP services can include performance management peg transfers, log transfers, data transfers, data integrity, network maintenance, network addresses, etc. These OAMP services are provided by the manager data processing units 104, 106 and 108 to the data processing units 116, 118, 120, 122, 124, 126, 128, 130 and 132.

The core data processing unit 102 sends a heartbeat signal to each of the data processing units 104, 106 and 108 for monitoring the functioning of the data processing units 104, 106 and 108. This process of the heartbeat signal being sent from the core data processing unit 102 is known as heartbeating. The core data processing unit 102 heartbeats the manager data processing units 104, 106 and 108 at regular intervals. The manager data processing units 104, 106 and 108 relay back the heartbeat signal to the core data processing unit 102, confirming their active state. Further, the manager data processing units 104, 106 and 108 transfer a record of performance parameters and the load of the data processing units 116, 118, 120, 122, 124, 126, 128, 130 and 132 to the core data processing unit 102 at predefined intervals. Examples of performance parameters can be the rate of the traps at a data processing unit, the loading characteristics of the data processing unit, number of packets transferred, bytes transferred, event logs, alarm log files, etc. Hence, the core data processing unit 102 is capable of managing the data processing units 116, 118, 120, 122, 124, 126, 128, 130 and 132. For an embodiment of the present invention, the data processing units 116, 118, 120, 122, 124, 126, 128, 130 and 132 may be located at various geographical locations.

For another embodiment of the present invention, the heartbeat signal can be generated at the manger data processing units 104, 106, and 108. The manager data processing units 104, 106, and 108 periodically send the heartbeat signal to the core data processing unit 102 confirming their active state.

Figure 2:
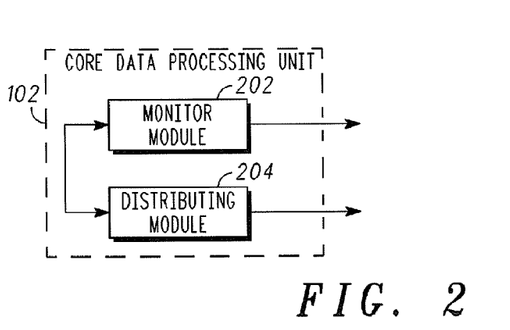
FIG. 2 illustrates a functional diagram of a core data processing unit, in accordance with some embodiments of the present invention.

FIG. 2 illustrates a functional diagram of a core data processing unit 102, in accordance with some embodiments of the present invention. The core data processing unit 102 monitors manager data processing units 104, 106 and 108. The manager data processing units 104, 106 and 108 serve pools of data processing units 110, 112 and 114 with OAMP services. The core data processing unit 102 includes a monitoring module 202 and a distributing module 204. The monitoring module 202 monitors the manager data processing units 104, 106 and 108 by sending a heartbeat signal to each of the manager data processing units 104, 106 and 108. The heartbeat signal is sent by a transreceiving module at predefined intervals. Each of the manager data processing units 104, 106 and 108 relay back the heartbeat signal to the core data processing unit 102, confirming their active state. Each of the manager data processing units 104, 106 and 108 further send a record of the performance parameters and the load of each of the data processing units 116, 118, 120, 122, 124, 126, 128, 130 and 132 to the core data processing unit 102. Examples of performance parameters can be the rate of the traps at a data processing unit, the loading characteristics of the data processing unit, etc. The relayed heartbeat signal and the record are received at the transreceiving module of the core data processing unit 102. Further, the monitoring module 202 processes the record sent by the manager data processing units 104, 106 and 108, to enable the core data processing unit 102 to manage the communication network 100. Further, the monitoring module 202 stores information related to the manager data processing units. This information may include information such as the load on each manager data processing unit, the number of data processing units served by each of the manager data processing units, and other information pertaining to the manager data processing units. Further, the monitoring module 202 stores information related to the number of managed objects managed by each of the data processing units.

The distributing module 204 distributes the data processing units 116, 118, 120, 122, 124, 126, 128, 130 and 132 when a failure occurs at the manager data processing unit 106 of the manager data processing units 104, 106 and 108, and is detected by the monitoring module 202. The monitoring module 202 detects the failure when the manager data processing unit 106 skips one or more heartbeats at the core data processing unit 102. The distributing module 204 allocates the data processing units 116, 118, 120, 122, 124, 126, 128, 130 and 132 to the manager data processing units 104 and 108. When the manager data processing unit 106 is restored, the manager data processing unit 106 starts sending the heartbeat signal back to the core data processing unit 102. Thereafter, the distributing module 204 redistributes the data processing units 116, 118, 120, 122, 124, 126, 128, 130 and 132 after receiving the heartbeat signal at the transreceiving module. The distributing module 204 may provide the addresses of the data processing units 116, 118, 120, 122, 124, 126, 128, 130 and 132 to the manager data processing units 104, 106 and 108 by using a memory module. The memory module stores and updates the addresses of the data processing units 116, 118, 120, 122, 124, 126, 128, 130 and the manager data processing units 104, 106 and 108. It should be appreciated that a failure at the manager data processing unit 106 is shown only for exemplary purposes and is applicable to all the manager data processing units.

For another embodiment of the present invention, the data processing units 116, 118, 120, 122, 124, 126, 128, 130 and 132 may be allocated, based on predefined criteria. These predefined criteria may include detecting the failure at a manager data processing unit. After detecting the failure of a manager data processing unit of the manager data processing units 104, 106 and 108, the distributing module 204 compares the record of the parameters and the load of the manager data processing units 104, 106 and 108. The distributing module 204 can further assign a pool of data processing units, served by the manager data processing unit, to remaining active manager data processing units.

Figure 3:
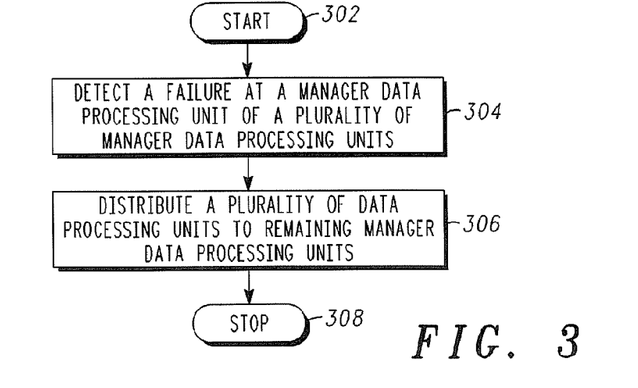
FIG. 3 illustrates a flow diagram of a method for distributing a plurality of data processing units in a communication network, in accordance with some embodiments of the present invention.

FIG. 3 illustrates a flow diagram for a method for distributing the data processing units in the communication network 100, in accordance with some embodiments of the present invention. The communication network 100 includes a core data processing unit 102 for monitoring manager data processing units 104, 106 and 108. The manager data processing units 104, 106 and 108 serve pools of data processing units 110, 112 and 114. The pools of data processing units 110, 112 and 114 include the data processing units 116, 118, 120, 122, 124, 126, 128, 130 and 132. The manager data processing units 104, 106 and 108 provide the pools of data processing units 110, 112 and 114 with OAMP services. For an embodiment of the present invention, a failure at a manager data processing unit 106 results in the disruption of OAMP services to a pool of data processing units 112. To provide uninterrupted OAMP services to the pool of data processing units 112, the data processing units 122, 124 and 126 of the pool of data processing units 112 are distributed among the remaining active manager data processing units 104 and 108. The method starts at step 302. At step 304, the core data processing unit 102 detects the failure at the manager data processing unit 106. The core data processing unit 102 sends a heartbeat signal at a predefined interval to each of the manager data processing unit 104, 106 and 108. Each of the manager data processing units 104, 106 and 108 relays the heartbeat signal back to the core data processing unit 102. If the core data processing unit 102 does not receive the heartbeat signal from the manager data processing unit 106, the core data processing unit 102 becomes aware of the failure at the manager data processing unit 106. At step 306, the core data processing unit 102 distributes the plurality of data processing units served by the manager data processing units 106 to the remaining manager data processing units 104 and 108.

For an embodiment of the present invention, the heartbeat signal can be generated at the manger data processing units 104, 106, and 108. The manager data processing units 104, 106, and 108 periodically send the heartbeat signal to the core data processing unit 102 confirming their active state. For another embodiment of the present invention, the core data processing unit 102 can detect the failure at the manager data processing unit 106 when a faulty heartbeat signal is received at the core data processing unit 102. For another embodiment of the present invention, the core data processing unit 102 can detect the failure at the manager data processing unit 106 when the core data processing unit 102 detects a deviation in the heartbeat signal sent by the manager data processing unit 106.

For an embodiment of the present invention, the core data processing unit 102 distributes the plurality of data processing units served by the manager data processing unit 106 to the remaining data processing units, based on an equitable algorithm. The equitable algorithm includes comparing the load on each of the manager data processing units 104, 106 and 108. Examples of the load can be the rate of the traps at the manager data processing units 104, 106 and 108, the network load, the computational load, the exchange of resources, etc. Exchange of resources can be by the exchange of performance management peg transfers, log file transfers, etc. For an embodiment of the present invention the equitable algorithm includes distributing the data processing units 122, 124, and 126 from the pool of data processing units 112 to the remaining manager data processing units 104 and 108, maintaining an equal load on the remaining manager data processing units 104 and 108. For another embodiment of the present invention, the equitable algorithm may include comparing the number of data processing units served by the remaining manager data processing units 104 and 108. Further, the equitable algorithm may include distributing the data processing units of the pool of data processing units 112 to the remaining manager data processing units 104 and 108, maintaining an equal number of data processing units served by the remaining manager data processing units 104 and 108. For another embodiment of the present invention, the equitable algorithm may include comparing a number of managed objects managed by or contained within the data processing units 116, 118, 120, 122, 124, 126, 128, 130 and 132. Further, the equitable algorithm may include distributing the data processing units of the pool of data processing units 112 to the remaining manager data processing units 104 and 108, maintaining an equal number of managed objects of the remaining manager data processing units 104 and 108. Examples of managed objects can be short messaging services modules and GPRS modules in cellular phones, etc. The method terminates at step 308.

Figure 4:
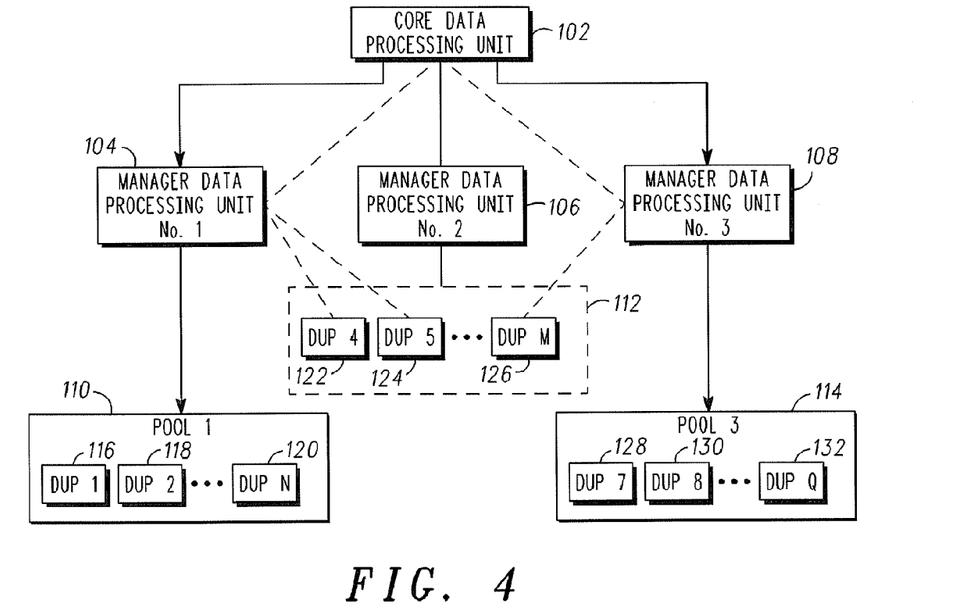
FIG. 4 is a functional diagram illustrating the association of a plurality of manager data processing units with the plurality of data processing units after failure of a manager data processing unit, in accordance with an embodiment of the present invention.

FIG. 4 is a functional diagram illustrating an association of a plurality of manager data processing units with a plurality of data processing units after a failure at a manager data processing unit 106, in accordance with various embodiments of the present invention. The communication network 100 includes a core data processing unit 102 for monitoring manager data processing units 104, 106 and 108. The manager data processing units 104, 106, and 108 serve pools of data processing units 110, 112 and 114. The pools of data processing units 110, 112 and 114 include data processing units 116, 118, 120, 122, 124, 126, 128, 130 and 132. The manager data processing units 104, 106 and 108 provide the data processing units 116, 118, 120, 122, 124, 126, 128, 130 and 132 with OAMP services. The core data processing unit 102 sends a heartbeat signal to each of the manager data processing units 104, 106 and 108 at a predefined interval. Each of the manager data processing unit 104, 106 and 108 relays back the heartbeat signal to the core data processing unit 102.

The core data processing unit 102 detects a failure at the manager data processing unit 106. The core data processing unit 102 detects the failure when the core data processing unit 102 does not receive the one or more heartbeat signal relayed by the manager data processing unit 106. For an embodiment of the present invention, the core data processing unit 102 detects the failure at the manager data processing unit 106 when a fault is indicated by the heartbeat signal relayed by the manager data processing unit 106. The core data processing unit 102 distributes the data processing units 122, 124 and 126, served by the manager data processing unit 106, to the remaining data processing units 104 and 108, based on an equitable algorithm.

The core data processing unit 102 distributes the pool of data processing units 112, comprising data processing units 122, 124 and 126, between the manager data processing units 104 and 108. The core data processing unit 102 distributes the data processing units 122 and 124 to the manager data processing unit 104 and instructs the manager data processing unit 104 to serve the data processing units 122 and 124 with OAMP services. Further, the core data processing unit 102 distributes the data processing unit 126 to the manager data processing unit 108. Moreover, the core data processing unit 102 instructs the manager data processing unit 108 to serve the data processing unit 126. Furthermore, the manager data processing units 104 and 108 keep a record of the performance parameters and the load of the data processing units 122, 126 and 124, respectively. The manager data processing units 104 and 108 both periodically transfer the record of data processing units 122, 124 and 126 to the core data processing unit 102. The core data processing unit 102 processes the record received for managing the data processing units 116, 118, 120, 122, 124, 126, 128, 130 and 132. The manager data processing unit 106 is shown to fail only for exemplary purposes, and it should be appreciated that the invention can be practiced in the event of the failure of any manager data processing unit of the plurality of manager data processing units.

Figure 5:
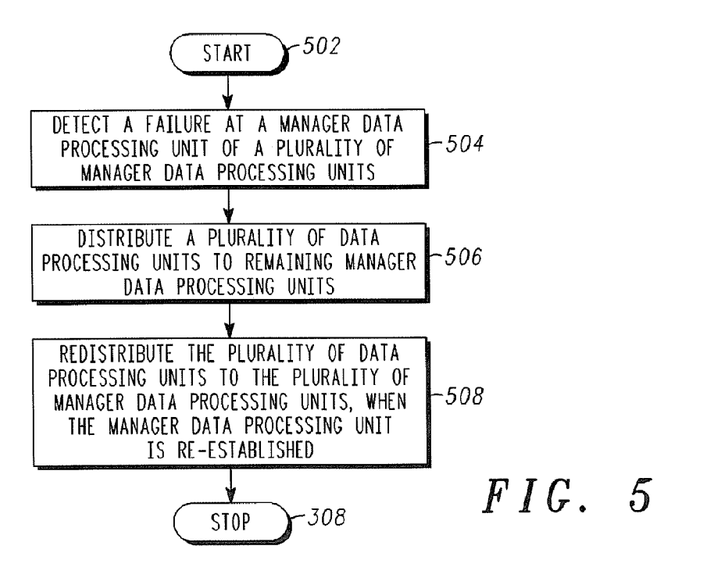
FIG. 5 illustrates a flow diagram of a method for distributing the plurality of data processing units in the communication network, in accordance with an embodiment of the present invention.

FIG. 5 illustrates an alternative method for distributing a plurality of data processing units in the communication network 100, in accordance with an embodiment of the present invention. The communication network 100 includes a core data processing unit 102 for monitoring manager data processing units 104, 106 and 108. The manager data processing units 104, 106 and 108 serve pools 110, 112 and 114 of data processing units 116, 118, 120, 122, 124, 126, 128, 130 and 132 with OAMP services. In an event of a failure at a manager data processing unit 106, the OAMP services to a pool of data processing units 112 get disrupted. To provide uninterrupted OAMP services to the pool of data processing units 112, the pool of data processing units 112 is distributed among remaining active manager data processing units 104 and 108. The method for distributing the plurality of data processing units starts at step 502. At step 504, the core data processing unit 102 detects the failure at the manager data processing unit 106 when the manager data processing unit 106 skips one or more heartbeats. At step 506, the core data processing unit 102 distributes the data processing units 122, 124 and 126 served by the manager data processing unit 106 to the remaining data processing units 104 and 108.

At step 508, the core data processing unit 102 redistributes the data processing units 116, 118, 120, 122, 124, 126, 128, 130 and 132 to the manager data processing units 104, 106 and 108, after receiving the regular heartbeat signal from the manager data processing unit 106. The regular heartbeat signal from the manager data processing unit 106 indicates that the manager data processing unit 106 is now able to serve the data processing units with OAMP services. The core data processing unit 102 redistributes the data processing units 116, 118, 120, 122, 124, 126, 128, 130 and 132. The method terminates at step 510.

For another embodiment of the present invention, the core data processing unit 102 distributes and redistributes the data processing units 116, 118, 120, 122, 124, 126, 128, 130 and 132, based on an equitable algorithm. For another embodiment of the present invention, the core data processing unit 102 receives a regular heartbeat signal when the manager data processing unit 106 is re-established. For another embodiment of the present invention, the core data processing unit 102 receives a restore signal when the manager data processing unit 106 is restored.

Figure 6:
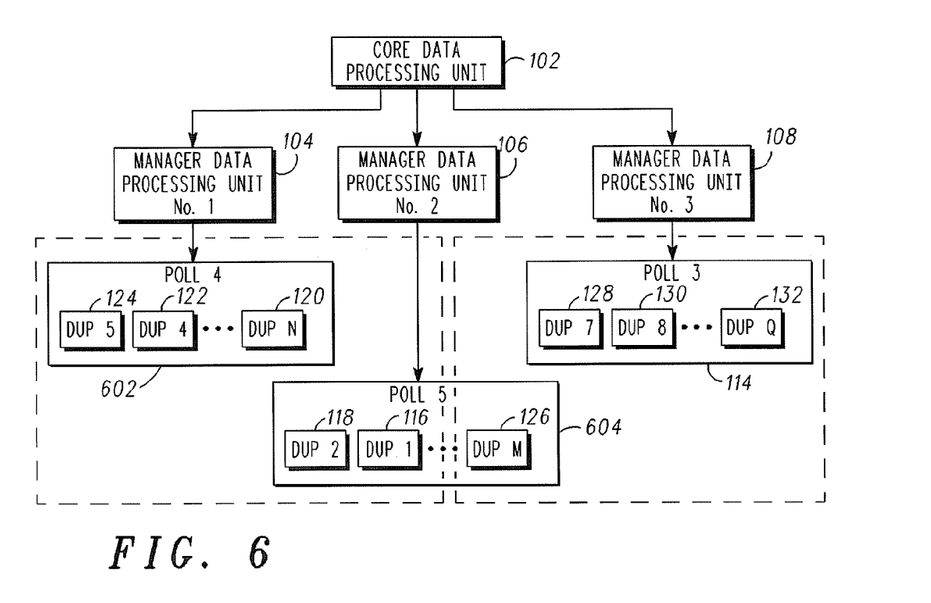
FIG. 6 is a functional diagram illustrating the association of the plurality of manager data processing units with the plurality of data processing units when a manager data processing unit is restored in the communication network, in accordance with another embodiment of the present invention.

FIG. 6 is a functional diagram illustrating an association of a plurality of manager data processing units with a plurality of data processing units, after the re-establishment of a manager data processing unit, in accordance with some embodiments of the present invention. When the manager data processing unit 106 suffers a failure, it is unable to provide OAMP services to the plurality of data processing units 122, 124 and 126. The data processing units 122, 124 and 126 are distributed to manager data processing units 104 and 108. When the core data processing unit 102 starts receiving the heartbeat signal from the manager data processing unit 106, indicating that the manager data processing unit 106 has been restored, a redistribution of data processing units should take place. When the manager data processing unit 106 is restored, the manager data processing unit 106 starts relaying back the heartbeat signal sent by the core data processing unit 102. When the core data processing unit 102 starts receiving the heartbeat signal, the distributing module 204 of the core data processing unit 102 redistributes the data processing units 116, 118, 120, 122, 124, 126, 128, 130 and 132. The distributing module 204 redistributes the data processing units 116, 118, 120, 122, 124, 126, 128, 130 and 132 on the basis of the equitable algorithm. For an embodiment of the present invention, the core data processing unit 102 may receive a restore signal, indicating that the manager data processing unit 106 has been restored.

The core data processing unit 102 assigns the manager data processing unit 106 to serve data processing units 116, 118, and 126, based on the equitable algorithm. Further, the core data processing unit 102 instructs the manager data processing unit 104 to serve the data processing units 120, 122 and 124. Furthermore, the core data processing unit 102 instructs the manager data processing unit 108 to serve the data processing units 128, 130 and 132. Moreover, the manager data processing unit 104 serves a pool of data processing units 602, including the data processing units 120, 122 and 124. The manager data processing unit 106 serves a pool of data processing units 604, including data processing units 116, 118 and 126. The manager data processing unit 108 serves the pool of data processing units 114, including the data processing units 128, 130 and 132. Further the manager data processing units 104, 106 and 108 start transferring the records to the core data processing unit 102.

Figure 7:
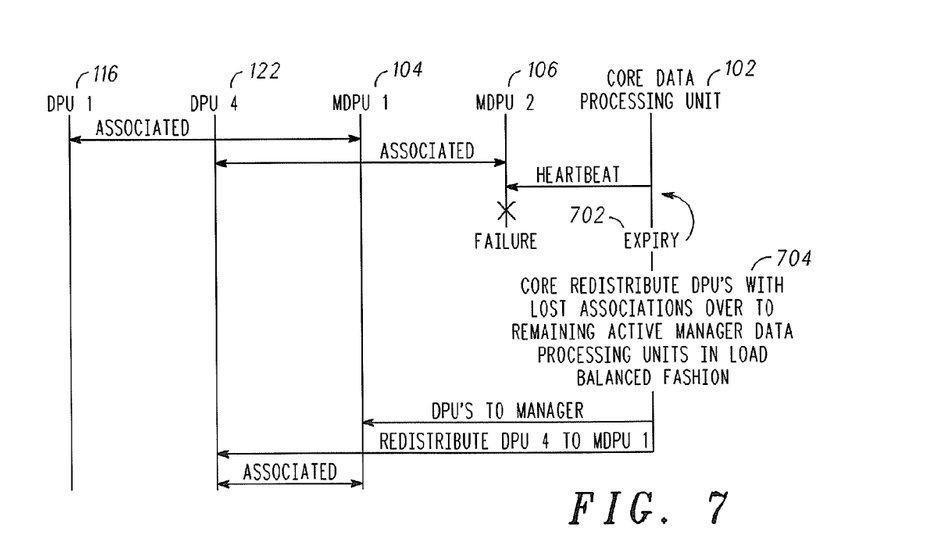
FIG. 7 is a functional diagram illustrating flow messages between the core data processing unit, the manager data processing units, and the data processing units for various embodiments of the invention.

FIG. 7 is a functional diagram illustrating flow messages between the core data processing unit 102, the manager data processing units 104 and 106, and the data processing units 116 and 122 for various embodiments of the invention. The core data processing unit 102 sends a heartbeat to each of the manager data processing units 104 and 106. The manager data processing units 104 and 106 relay back the heartbeat to the core data processing unit 102, confirming their active state. Therefore, the manager data processing units 104 and 106 serve data processing units 116 and 122, respectively, with OAMP services. Further, the manager data processing units 104 and 106 store a record of performance parameters and their load periodically. Moreover, the manager data processing units 104 and 106 send back a record of their performance parameters and load to the core data processing unit 102. When there is a failure at the manager data processing unit 106, the manager data processing unit 106 stops relaying back the heartbeat. The core data processing unit 102 detects the failure at the manager data processing unit 106 when there is a break in the heartbeat sent by manager data processing unit 106. After detecting the failure, the core data processing unit 102 assigns the data processing unit 122 to the manager data processing unit 104, based on an equitable algorithm. The core data processing unit 102 instructs the manager data processing unit 104 to serve data processing unit 122 with OAMP services. Further, the core data processing unit 102 distributes the data processing unit 122 to the manager data processing unit 104, to avail of OAMP services. Further, the manager data processing unit 104 keeps a record of the performance parameters and load of the data processing unit 122. Moreover, the manager data processing unit 104 also starts relaying back the record of the activities of data processing unit 122 to the core data processing unit 102 at a predefined interval.

Figure 8:
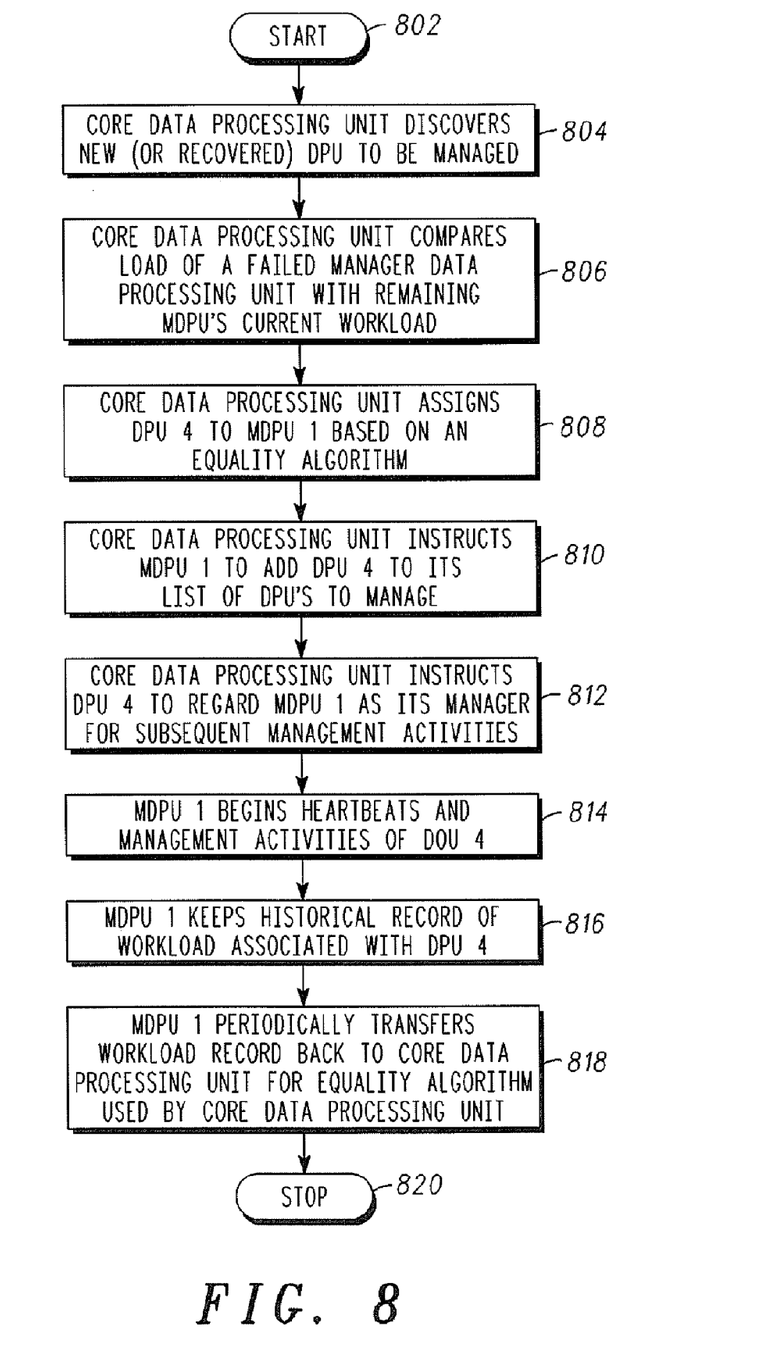
FIG. 8 illustrates a flow diagram of a method for distributing the plurality of data processing units in the communication network, in accordance with another embodiment of the inventive arrangements of the present invention.

FIG. 8 illustrates a flow diagram of a method for distributing a plurality of data processing units in a communication network, in accordance with another embodiment of the present invention. With reference to FIG. 7, the core data processing unit 102 monitors the manager data processing units 104 and 106. The manager data processing unit 104 serves the data processing unit 116, and the manager data processing unit 106 serves the data processing unit 122 with OAMP services.

The core data processing unit 102 sends a heartbeat to each of the manager data processing units 104 and manager data processing units 106 at a predefined interval. The manager data processing units 104 and 106 relay back the heartbeat to the core data processing unit 102. Further, the manager data processing units 104 and 106 transfer the records of their performance parameters and load to the core data processing unit 102 at the predefined interval. The core data processing unit 102 detects the failure when there is a break in the heartbeat signal relayed by manager data processing unit 106. The method for distributing the plurality of data processing units starts at step 802. At step 804, the core data processing unit 102 discovers a new or recovered data processing unit 122, which is to be served with OAMP services. At step 806, the core data processing unit 102 compares the load of manager data processing units 104 and 106. The load can be a network load, a computational load or resource transfers. Records of the load can include periodic performance management peg transfers, log transfers, etc.

At step 808, the core data processing unit 102 assigns the data processing unit 122 to the manager data processing unit 104, based on an equality algorithm. At step 810, the core data processing unit 102 instructs the manager data processing unit 104 to add the data processing unit 122 to its list of data processing units to be served. The manager data processing unit 104 serves the data processing unit 122 with the OAMP services. At step 812, core data processing unit 102 instructs the data processing unit 122 to consider manager data processing unit 104 as its parent service provider. The data processing unit 122 will now receive the OAMP services from the manager data processing unit 104. The data processing unit 122 will start resource exchange with the manager data processing unit 104. At step 814, the manager data processing unit 104 starts managing the activities of the data processing unit 122. At step 816, the manager data processing unit 104 starts keeping a record of the performance parameters and load of the data processing unit 122. The manager data processing unit 104 updates the record of the data processing unit 122 periodically. At step 818, the manager data processing unit 104 transfers the record of data processing unit 122 to the core data processing unit at the predefined interval. The core data processing unit 102 uses this record of the data processing unit 122 to manage the plurality of data processing units. The method terminates at step 820.

For another embodiment of the present invention, a communication network includes a plurality of network elements, a plurality of mediation servers, and an element manager core server. The plurality of network elements is logically linked to the plurality of mediation servers, and the plurality of mediation servers to the element manager core server subsequently. The element manager core server monitors the functioning of each of the plurality of mediation servers by periodically checking their parameters. The plurality of mediation servers serves the plurality of network elements with OAMP services.

For another embodiment of the present invention, a redundant manager data processing unit can be added to the communication network 100, to provide OAMP services. The redundant manager data processing unit makes the communication network 100 scalable. After the addition of the redundant manager data processing unit, the data processing units 116, 118, 120, 122, 124, 126, 128, 130 and 132 can be distributed, so as to balance the load on the manager data processing units 104, 106 and 108. The distribution of the data processing units 116, 118, 120, 122, 124, 126, 128, 130 and 132 can be based on the equitable algorithm. For another embodiment of the present invention, a new plurality of data processing units can be added to the communication network 100. When the new plurality of data processing units is added, the data processing units 116, 118, 120, 122, 124, 126, 128, 130 and 132 are allocated to one or more of the manager data processing units 104, 106 and 108, based on an equitable algorithm. For an embodiment of the present invention, the equitable algorithm includes comparing the load on each of the manager data processing units of the manager data processing units 104, 106 and 108. Further, the new plurality of data processing units are assigned to at least one manager data processing unit of the manager data processing units 104, 106 and 108, such that at least one manager data processing unit of the manager data processing units 104, 106 and 108 is least loaded. For another embodiment of the present invention, the equitable algorithm assigns the new plurality of data processing units, such that each manager data processing unit of the manager data processing units 104, 106 and 108 is loaded with the least number of data processing units. For another embodiment of the present invention, the equitable algorithm assigns the new plurality of data processing units, such that each manager data processing unit of the manager data processing units 104, 106 and 108 manages the least number of objects.

The present invention aims to distribute a plurality of data processing units in a communication network. The communication network includes a core data processing unit, which monitors a plurality of manager data processing units. Further, the plurality of manager data processing units is capable of serving a plurality of data processing units with OAMP services. The present invention ensures uninterrupted OAMP services to the plurality of data processing units in the event of a failure at a manager data processing unit. Further, the present invention enables the communication network to dynamically add a data processing unit, maintaining equal load distribution in the communication network. Moreover, the present invention distributes the plurality of data processing units on the basis of an equitable algorithm, which ensures an equal load on each of the plurality of manager data processing units. For another embodiment of the present invention, the equitable algorithm also ensures an equal number of data processing units, served by each of the manager data processing units. For another embodiment, the equitable algorithm ensures an equal number of managed objects in each of the plurality of manager data processing units. The present invention also ensures minimal manual intervention and consequently provides enhanced reliability in the communication network.

It will be appreciated the method and system for distributing data processing units in the communication network described herein may be comprised of one or more conventional processors and unique stored program instructions that control the one or more processors to implement some, most, or all of the functions described herein. Alternatively, the same functions could be implemented by a state machine that has no stored program instructions, in which each function or some combinations of certain portions of the functions are implemented as custom logic. A combination of the two approaches could be used. Thus, methods and means for performing these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the present invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

The terms "including" and/or "having", as used herein, are defined as comprising. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for distributing a plurality of data processing units in a communication network, wherein the communication network comprises a plurality of manager data processing units for serving the plurality of data processing units, the method comprising:
    detecting at a core data processing unit a failure at a manager data processing unit of the plurality of manager data processing units each of which provides operational, administrative, maintenance and provisioning functions for the plurality of data processing units; and
    distributing by the core data processing unit the plurality of data processing units served by the detected failed manager data processing unit to remaining manager data processing units of the plurality of manager data processing units so that the administrative, maintenance and provisioning functions are provided to the data processing units served by the detected failed manager data processing unit.

2. The method as recited in claim 1 further comprising a prior step of receiving a signal at the core data processing unit at a regular time interval, wherein the signal is being sent by each of the plurality of manager data processing units.

3. The method as recited in claim 1, wherein detecting the failure comprises receiving a fault signal at the core data processing unit, the fault signal being sent by the manager data processing unit of the plurality of manager data processing units.

4. The method as recited in claim 1, wherein the plurality of data processing units is distributed by the core data processing unit equitably to the remaining manager data processing units.

5. The method as recited in claim 4, wherein distributing the plurality of data processing units equitably further comprises maintaining an equal load for the remaining manager data processing units.

6. The method as recited in claim 4, wherein distributing the plurality of data processing units equitably further comprises maintaining an equal number of data processing units for the remaining manager data processing units.

7. The method as recited in claim 4, wherein distributing the plurality of data processing units equitably further comprises maintaining an equal number of managed objects for the remaining manager data processing units.

8. The method of claim 1 further comprising receiving a restore signal at a core data processing unit, wherein the restore signal indicates re-establishment of the detected failed manager data processing unit.

9. The method of claim 8 further comprising redistributing the plurality of data processing units equitably to the plurality of manager data processing units.

10. The method as recited in claim 1 further comprising assigning a plurality of new data processing units to at least one manager data processing unit of the plurality of manager data processing units, wherein the at least one manager data processing unit is least loaded.

11. A method for distributing a plurality of data processing units in a communication network, wherein the communication network comprises a plurality of manager data processing units for serving the plurality of data processing units, the method comprising:
    detecting by a core data processing unit a failure at a manager data processing unit of the plurality of manager data processing units each of which provides operational, administrative, maintenance and provisioning functions to the plurality of data processing units;
    distributing by the core data processing unit the plurality of data processing units served by the detected failed manager data processing unit to remaining manager data processing units of the plurality of manager data processing units so that the operational, administrative, maintenance and provisioning functions are provided to the data processing units served by the detected failed managing data processing units; and
    redistributing the plurality of data processing units to the plurality of manager data processing units, when the core data processing unit receives a restore signal from the manager data processing unit.

12. The method as recited in claim 11 further comprising a prior step of receiving a signal at the core data processing unit at a regular time interval, wherein the signal is being sent by each of the plurality of manager data processing units.

13. The method as recited in claim 11, wherein detecting the failure comprises receiving a fault signal at the core data processing unit, the fault signal being sent by the manager data processing unit of the plurality of manager data processing units.

14. The method as recited in claim 11, wherein the plurality of data processing units is distributed equitably to the remaining manager data processing units.

15. The method as recited in claim 14, wherein distributing the plurality of data processing units equitably further comprises maintaining an equal load for the remaining manager data processing units.

16. The method as recited in claim 14, wherein the distributing the plurality of data processing units equitably comprises maintaining an equal number of data processing units for the remaining manager data processing units.

17. The method as recited in claim 14, wherein the distributing the plurality of data processing units equitably comprises maintaining an equal number of managed objects for the remaining manager data processing units.

18. The method as recited in claim 11, wherein the plurality of data processing units is redistributed equitably to the plurality of manager data processing units.

19. The method as recited in claim 11 further comprising allocating a plurality of new data processing units to at least one manager data processing unit of the plurality of manager data processing units, wherein the at least one manager data processing unit is least loaded.

20. A core data processing unit for monitoring a plurality of manager data processing units in a communication network, wherein the communication network comprises the plurality of manager data processing units for serving a plurality of data processing units, the core data processing unit comprising:
    a monitoring module for detecting a signal sent by each of the plurality of manager data processing units wherein the manager data processing units provide operational, administrative, maintenance and provisioning functions to the plurality of data processing units; and
    a distributing module for distributing the plurality of data processing units to remaining manager data processing units of the plurality of manager data processing units, when a failure of a manager data processing unit of the plurality of manager data processing units is indicated by the signal so that the operational, administrative, maintenance and provisioning functions of the failed managed data processing unit are provided to the data processing units served by the failed managed data processing unit.

21. The core data processing unit as recited in claim 20, wherein the plurality of data processing units is distributed equitably to the remaining manager data processing units.

22. The core data processing unit as recited in claim 20 further comprises:
    a transreceiving module for sending and receiving data; and
    a memory module for storing network identification information of the plurality of data processing units and the plurality of manager data processing units.

* * * * *